(12) United States Patent
Schoppmeier et al.

(10) Patent No.: US 10,707,997 B2
(45) Date of Patent: Jul. 7, 2020

(54) RECOVERING OF A COMMUNICATION CHANNEL

(71) Applicant: Intel Corporation, Santa Clara, CA (US)

(72) Inventors: Dietmar Schoppmeier, Unterhaching (DE); Vladimir Oksman, Morganville, NJ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/092,673

(22) PCT Filed: May 2, 2017

(86) PCT No.: PCT/EP2017/060362
§ 371 (c)(1),
(2) Date: Oct. 10, 2018

(87) PCT Pub. No.: WO2017/191103
PCT Pub. Date: Nov. 9, 2017

(65) Prior Publication Data
US 2019/0173610 A1    Jun. 6, 2019

Related U.S. Application Data

(60) Provisional application No. 62/330,275, filed on May 2, 2016.

(51) Int. Cl.
H04L 1/00        (2006.01)
H04M 11/06       (2006.01)
H04B 17/336      (2015.01)
H04L 5/00        (2006.01)
H04L 5/14        (2006.01)
H04W 72/04       (2009.01)

(52) U.S. Cl.
CPC .......... *H04L 1/007* (2013.01); *H04B 17/336* (2015.01); *H04L 1/0072* (2013.01); *H04L 5/0055* (2013.01); *H04L 5/1469* (2013.01); *H04M 11/062* (2013.01); *H04W 72/0446* (2013.01)

(58) Field of Classification Search
None
See application file for complete search history.

(56) References Cited

U.S. PATENT DOCUMENTS

2015/0055449 A1* 2/2015 Li ................... H04L 1/0072
                                                370/216

OTHER PUBLICATIONS

International Search Report dated Jul. 19, 2017 for International Application PCT/EP2017/060362.
"Homework 92_Revisit earlier discussions on RPA acknowledgement R1." ITU-T Draft; Study Period 2013-2016. International Telecommunication Union, Geneva, CH., vol. 4/15. Sep. 2, 2014. pp. 1-6, XP044120663.

(Continued)

Primary Examiner — Diane L Lo
(74) Attorney, Agent, or Firm — 2SPL Patent Attorneys

(57) ABSTRACT

Methods and devices are provided to recover a robust management channel (RMC) in a first communication direction using a robust management channel recovery message (RMCR) sent via the RMC in a second communication direction.

28 Claims, 3 Drawing Sheets

(56) References Cited

OTHER PUBLICATIONS

Oksman, Vladimir. "G.9701: Proposed homework on Clause 9." Source: Lantiq. Question 4/15. ITU—Telecommunication Standardization Sector. Study Group 15. Geneva, Switzerland, Jul. 21-25, 2014. Temporary Document 2014-06-Q4-030. 10 pages.

"Homework 67 1—Clause 12.1.4." Deactivation_re-initialization—v5. ITU-T Draft; Study Period 2013-2016. International Telecommunication Union, Geneva, CH. vol. 4/15, Aug. 28, 2014, pp. 1-9, XP044119308.

* cited by examiner

RECOVERING OF A COMMUNICATION CHANNEL

This application is a National Phase entry application of International Patent Application No. PCT/EP2017/060362 filed May 2, 2017, which claims priority to U.S. Provisional Application 62/330,275 filed on May 2, 2016, entitled "RECOVERING OF THE COMMUNICATION CHANNEL IN HARSH NON-STATIONARY NOISE CONDITION" in the name of Dietmar Schoppmeier et al. and is hereby incorporated by reference in its entirety.

TECHNICAL FIELD

The present application relates to recovering a communication channel, for example a robust management channel thereof, in a communication system, and to corresponding methods and devices.

BACKGROUND

Modem high-speed communication systems over a twisted pair (e.g. of copper lines) or other communication lines usually use crosstalk cancellation, which reduces substantially the stationary noise at the input of the receiver. This crosstalk cancellation is also referred to as vectoring. Thus, non-stationary noise becomes one of the main noise components remaining after crosstalk cancellation. Examples of non-stationary noise are narrow-band and wide-band RFI (Radio frequency interference), operation of other broadband communication systems, such as PLC (power line communication), or unexpected changes in channel characteristics, such as disordered disconnect of lines in a cable binder including the twisted pair. Various approaches have been defined to protect against these noise components.

The Robust Management Channel (RMC) is defined in communication systems to support management procedures that have to be extremely reliable, such as simultaneous changing of modem configuration at both sides of a communication line. The RMC is also used to recover a data channel over the communication line when its signal-to-noise ratio (SNR) margin drops so low that no data communication is possible. In G.fast (ITU-T G.9701, as approved Dec. 5, 2014, shortly referred to as G.9701 12/14 or G.fast herein), that uses Discrete Multi-Tone (DMT) modulation, RMC is defined to operate on a selected set of tones with high SNR margin, which provides much higher reliability of RMC than it is set for data. In other words, for the RMC a higher SNR margin than for other channels, for example for data channels, are provided. Furthermore, for the RMC channel a forward error correction (FEC) may be implemented, e.g. a FEC which is set to parameters allowing maximum protection. Thus, RMC can be used to recover data channel when the noise becomes too high for implementation of usual noise adaptation procedures over data channel, such as bit swapping and seamless rate adaptation (SRA).

In the following description, terms used may have a meaning as defined in G.fast (ITU-T G.9701) as approved Dec. 5, 2014, unless noted otherwise herein. Implementation of various components like transmitters, receivers or transceivers (combination of transmitter and receiver) may be as defined in G.fast.

The most important use of RMC in G.fast is for a Fast Rate Adaptation (FRA) procedure. When receiver detects a persistent failure of data transfer, it initiates FRA that can quickly recover the failed data channel via short commands sent over RMC. This however, requires RMC channel to be operable under noise conditions that data channel cannot withstand.

The RMC itself, however, can also be impaired by noise, which may reduce the SNR margin on RMC tones and even make these tones unavailable to information transfer. When the RMC has a reduced SNR margin or is disrupted, there is a need to recover it first in the aim to then get data channel back to work using e.g. the FRA procedure. A typical example of this is a scenario when a customer premises equipment (CPE) in a vectored system is disorderly disconnected or other changes in a transmission channels happened unexpectedly. Due to vectoring, changes in the channel may cause a drop of SNR so substantial that not only data channel, but also the RMC may fail. Therefore, a mechanism is needed to recover RMC when noise conditions are severe.

An RMC parameter adjustment (RPA) procedure is a part of the online reconfiguration (OLR) package defined by G.fast. It allows to recover the SNR margin by a RMC modification of the RMC tone set (RTS) and bit loading on the RMC tones, i.e. updating which tones shall be used for RMC and their bit loading. The RPA request is issued by the RMC receiver when robustness of the RMC is reduced, which is determined by applying a certain RPA criteria, such as loss of SNR margin on RMC tones. Upon detection that the RPA criteria is met, the receiver communicates to the far-end transmitter at the other end of the communication line the needed changes in the RTS and its bit loading, as well as the exact time of the change via the embedded overhead channel (eoc) of the opposite transmission direction, which is a part of the data channel. This RPA mechanism can operate only if noise damages only one direction of transmission, while in the other direction the eoc operates properly.

In case of a severe SNR margin drop at the receiver, so that neither data nor RMC communication can survive in a particular direction, the FRA cannot be used to recover data channel, but RPA procedure can still recover the RMC if the eoc is operable in the opposite direction. The expected time necessary to recover the RMC is about 100 ms. After RMC is recovered, the FRA can be applied to restore data communication and further SRA can adapt the system to new noise conditions and restore its performance.

The problem with this conventional solution occurs if the data/eoc channel in the opposite direction is also down under the impact of the noise: even if the RMC in the opposite direction is still alive, there is currently no means defined to use this alive RMC for recovering the system.

Besides, the conventional solutions do not address specifically the case of RMC failure in one transmission direction. In this case a synchronous change of RMC parameters by both transmitter and receiver connected to the line is not necessary (because the RMC is not functional anyway)

SUMMARY

According to an embodiment, a method is provided, comprising: at a transceiver, detecting a failure of at least a robust management channel (RMC) in a first communication direction from a further transceiver to the transceiver, and transmitting, by the transceiver, a robust management channel restoration (RMCR) command via a robust management channel in a second communication direction from the transceiver to the further transceiver in response to detecting the failure.

According to another embodiment, a method is provided, comprising: at a further transceiver, receiving an RMCR command via an RMC from a transceiver, and restoring an RMC in a first communication direction from the further transceiver to the transceiver based on the RMCR command.

According to another embodiment, a transceiver is provided, comprising: a receiver circuit configured to detect a failure of at least a robust management channel (RMC) in a first communication direction from a further transceiver to the transceiver, and a transmitter circuit configured to transmit a robust management channel restoration (RMCR) command via a robust management channel in a second communication direction from the transceiver to the further transceiver in response to detecting the failure.

According to another embodiment, a further transceiver is provided, comprising: a receiver circuit, configured to receive a RMCR command via a RMC from a transceiver, and a transmitter circuit configured to restore a RMC in a first communication direction from the further transceiver to the transceiver based on the RMCR command.

According to another embodiment, a corresponding system is provided, comprising a transceiver and a further transceiver as defined above.

DETAILED DESCRIPTION

Some embodiments present a remote management channel (RMC) Restoration (RMCR) procedure, which is a method that, in some implementations, allows recovering of an entire communication system disabled e.g. by strong noise using just RMC channel operating in one direction of transmission, i.e. either in upstream or in downstream, while data channels in both transmission directions and RMC channel in the other transmission direction are disabled by noise. The RMCR recovers the RMC of the opposite direction, and thus restores the RMC connectivity in both directions available. Further, data connectivity in both directions can then be recovered by a standard Fast Rate Adaptation (FRA) procedure. After data connectivity in both directions is recovered, both data and RMC performance can be restored for the best possible in current noise conditions using standard online reconfiguration (OLR) procedures (for example bit swapping, Seamless Rate Adaptation (SRA), and RMC parameter adjustment (RPA)). In this disclosure, the terms "restoration of a channel" (e.g. RMC) and "recovery of a channel" (e.g. RMC) may be used synonymously (same for restore and recover etc.) and may mean making a channel operational again after a failure of the channel.

It should be noticed that data and RMC failure in some embodiments are recovered rather quickly, before the line is forced to fast re-initialization triggered due to RMC/data failure. For this in some embodiments the RMCR uses a small set of short commands, because the capacity of RMC is usually very limited (unlike eoc, which in case of G.fast is multiplexed with the data channel), and can use asynchronous modification of RMC parameters, which restores the RMC as fast as the transmitter is capable to apply settings requested by the RMCR.

Figure 1:
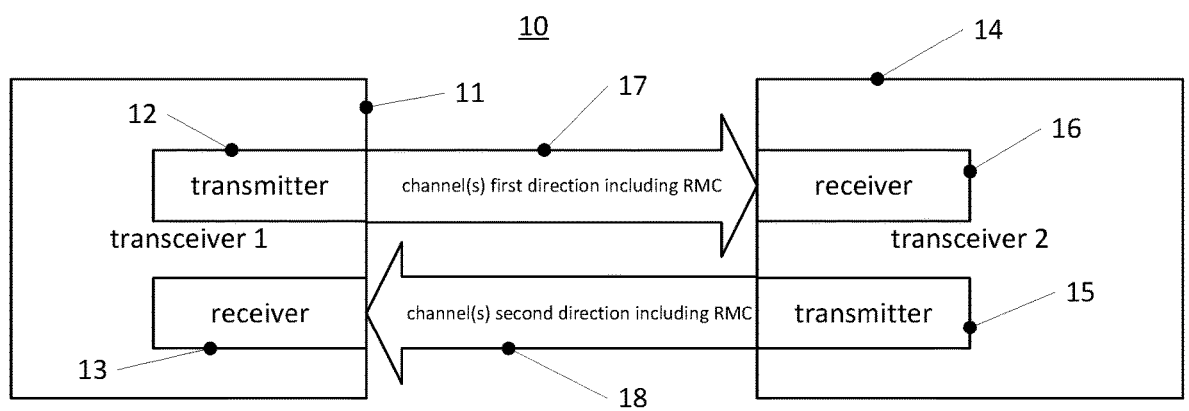
FIG. 1 shows a communication system according to an embodiment.

FIG. 1 shows a schematic diagram of a system 10 according to an embodiment. A first transceiver 11 comprising a first transmitter 12 and a first receiver 13 and a second transceiver 14 comprising a second transmitter 15 and a second receiver 16 communicate with each other in a bidirectional manner over a plurality of channels 17, 18, including RMC in both directions. Channels 17, 18 may be established according to G.fast on a twisted copper pair in some embodiments. E.g. when all channels except the RMC in one direction (e.g. 17) fail, the above techniques may be used to recover the other channels (e.g. RMC in other direction (e.g. 18), data channels etc.). Transceivers as understood herein are entities which are able to transmit and receive data. Apart from the capability to implement techniques as discussed above, such transceivers may be implemented as in conventional communication systems, for example as defined in G.fast as of December 2014 or other related standards. For example, transmitters 12, 15 and receivers 14,16 may comprise circuits like amplifiers, filters, modulators/demodulators, digital signal processors (DSPs) and/or application specific integrated circuits (ASICs), which may be modified (e.g. programmed and/or designed) to implement techniques as discussed herein.

One important generic requirement for RMC in some implementations is operation using very low channel capacity. The reason for this requirement is to provide high robustness while not degrade the efficiency and performance of the system. The currently defined RMC channel in G.fast can only transmit short messages per data transmission frame since the number bytes in RMC codeword has a limit of 32-64 bytes and each RMC codeword shall also carry a set of basic commands, so just few free bytes remains. The currently defined RPA command contains substantially bigger volume of information that include hundreds of bytes and thus can't be transferred over RMC. A part of the disclosure is a special condensed or shortened format used by the RMCR. A full (non-condensed or non-shortened) RMCR command would comprise carrier index and carrier bit loading for EACH carrier which is subject of change (as it is the case for today's RPA). In a condensed or shortened form, less information is transmitted. For example, condensing or shortening of the above-explained full change information is achieved in some implementations by using rules which are common for a group of carriers. Instead of communicating carrier index and carrier bit loading for EACH carrier which is subject of change, just the group(s) of carriers and its associated rule for the re-started RMC is communicated.

Besides, some embodiments introduce a way to modify RMC parameters at the transmitter asynchronously, which speeds up the recovery of the failed RMC.

Next, an RMCR procedure according to some embodiments will be described, While numerous features and details are described, this is not to be construed as limiting. The procedure described in the following works "one direction", without acknowledgement, because both RMC and data channel in the opposite direction are in failure. Accordingly:

The RMCR command that initializes the procedure is be transmitted by the transceiver in response to detection of a failure of the received RMC in an embodiment;

The RMCR command shall be implemented by the transmitter of the transceiver at the other side of the line; no rejection of the received RMCR command is allowed in some embodiments;

The RMCR command in some non-limiting embodiments carries the new RMC tone set (RTS) and new bit loading to be used by the RMC in the opposite direction; this information may be sent in a condensed/shortened form;

The RMCR command may be implemented by the transmitter and the receiver asynchronously, i.e., not at the same TDD frame or superframe (because no RMC connectivity anyway); in this case the receiver may apply RMCR parameters as it sends the RMCR, and transmitter can apply RMCR parameters at first opportunity, to provide faster RMC recovery. In some embodiments, and when RMCR is combined with FRA (see details below), RMCR may also carry the time marker (usually, a superframe down-count or the superframe index, or a TDD frame down-count or a TDD frame index) at which parameters requested by the RMCR shall be implemented by both the transmitter and receiver serving the transmission direction in which RMC failed. In both cases RMCR shall carry an RMCR identifier (to keep the same RMC configuration at both sides of the line);

The RMCR command may be repeatedly transmitted in some embodiments until RMC in the opposite direction is recovered. The receiver of one transceiver identifies RMC restoration by properly received RMC codewords (with number of error below the required threshold) and acknowledges the correctly received RMC codewords, so the transceiver at the opposite side of the line also identifies the RMC recovery by receiving ACKs on the transmitted RMC codewords. After the RMCR reaches its timeout or certain down-count is over (while RMC is not recovered), the FTU transmitting RMCR turns off to create conditions for re-starting the line.

It should be noted that:

1. The procedure according to some embodiments is more reliable than the RPA, because the status of eoc in the transmit direction is unknown when RMC in the receive direction fails. The RMC in the transmit direction has much higher probability to operate properly than the eoc. Besides the procedure according to some embodiments may restore the failed RMC much faster than RPA because it uses only one or very few short messages and may apply new RMC parameters asynchronously (in G.fast, RMC could be restored within few TDD frames (e.g. 1-2 frames for SNR margin drop detection and determination of new RTS and its possible bit loading, 1-2 frames for communication of RMCR, and, 1-2 frames for the transmitter to start sending RMC symbols with new parameters).

2. The RMCR as described herein may also be combined with FRA, so that both the failed RMC and failed data channel in one direction can be restored by using RMC operating in the opposite direction only. Combining RPA with FRA is not possible, because RPA is usually substantially longer than FRA. Combining RMCR and FRA can reuse FRA's determined SNR per tone and possibly even FRA's determined new bit loading.

Next, non-limiting examples for RMCR parameters will be described.

Two aspects are taken into account in some embodiments as regards the RMCR transmission format:

The RMCR in some implementations cannot have a format similar to RPA request command since the latter is suited for eoc and thus is too long for RMC (contains 512 or more bytes depending on the number of RTS tones for which changes have to be applied.

A brute force bit loading reduction for pre-determined tones or tone groups, as done in case of FRA, may not work because the RMC codeword size is fixed, because reduced bit loading will not fulfil the RMC codeword.

Some embodiments propose the following methods to minimize the size of the RMCR command.

In one embodiment, the RTS tones are selected using a pre-defined rule and a fixed bit loading on RTS tones is selected. In particular, after RMCR execution:

Both transmitter and receiver use the shortest available RMC codeword size.

All RMC tones use the same minimum bit loading (e.g., 2 bits per tone); this bit loading shall provide sufficient SNR margin on all or on the vast majority of the selected RTS tones.

The number of RTS tones ($N_{RTS}$) is determined by both sides using the selected RMC codeword size and the bit loading The actual RTS to be used after RMCR is picked by both sides using pre-defined rules. The following rules are proposed for one embodiment, wherein one or more of these rules may be implemented:

Rule 1: The fixed number $N_{RTS}$ of new RMC tones are selected based on the current bit loadings on data symbols; the first $N_{RTS}$ tones with the highest bit loading starting from the lowest tone index are selected;

Rule 2: The fixed number $N_{RTS}$ of new RMC tones are selected based on the current bit loadings on data symbols: the first $N_{RTS}$ tones with the highest bit loading, starting from the lowest tone index, but not used in the current RTS, are selected;

Rule 3: Rule 1 or Rule 2, but starting from the indicated tone index (which is bigger than the lowest carrier index);

Rule 4: Rule 1 or Rule 2, but when several groups of tones are selected, starting from the corresponding indicated tone indices (e.g., two groups of $N_{RTS}/2$ tones, starting from tone indices $i_1$ and $i_2$).

Use of the presented rules allows to reduce the size of the RMCR command in some embodiments: use of flat bit loading (in case of Rules 1-3) and use of flat bit loading in each group (in case of Rule 4) allows reduce the message size to less than few bytes, which allows to combine the RMCR command with other RMC commands in the same RMC codeword.

In another embodiment, the RTS tones and the bit loading (flat, same on all tones) are selected based on the actual SNR measured by the receiver:

Both transmitter and receiver use the shortest available RMC codeword size.

All RMC tones use the same bit loading; this bit loading shall provide sufficient SNR margin on all or on the vast majority of the selected RTS tones;

The actual value of bit loading and the actual number of RTS tones ($N_{RTS}$) is determined by the receiver based on the actually measured SNR; the receiver finds a group of contiguous tones in which every tone can carry the selected bit loading and the number of tones in this group is sufficient to carry an RMC codeword; after such group has been found, the RMCR indicates it to the transceiver at the other side of the line by the subcarrier index of the lowest RTS tone or highest RTS tone.

In another embodiment, instead of flat bit loading (same bit loading on all tones or a group of tones used for the RMC) a constant bit loading reduction (i.e. same reduction of bit loading for all tones or group of tones of RMC) relatively to a reference bit loading (e.g., latest bit loading during showtime) is applied. With this method, the receiver determined the actual RTS tones and the actual bit loading reduction (relative to the reference) also based on actually measured SNR.

Other rules can be used in other embodiments, such as one or more of:
(1) A pre-defined rule for deriving the RTS and RMC bit loading; this rule can be pre-defined by the standard or can be pre-defined by negotiation between transceivers at two ends of the line;
(2) The RTS and RMC bit loading is derived from the current SNRM (i) of RMC & data tones; communication of selected RMC tones and its bit loading is shortened by communication of selected tone group(s) for RMC and its associated bit-loading rule;
(3) Communication of selected RMC tones and its bit loading is shortened by:
    a. communication of selected tone group(s) for RMC and its associated bit-loading rule or
    b. communication of selected FRA sub-band(s) for RMC and its associated bit-loading rule With any of mentioned embodiment, use of asynchronous parameter change saves communication of time reference (expressed as superframe index, TDD frame index, superframe/frame count-down, or other reference time value).

Triggering criteria for RMCR is some embodiments reflect cases when RMC is practically dysfunctional (i.e. essentially non-operational, for example when a predetermined number of consecutive non-correctable errors occur) and in embodiments do not overlap with triggering criteria for RPA (e.g. when RPA is possible, RPA is applied, and only when RPA is not possible RMCR is used), which is intended to maintain high robustness of RMC under regular noise conditions (when RMC can still be received regularly).

The criteria may include one or more of the following events:
  critical reduction of SNRM (0 dB and below 0) on substantial number of tones in RTS; and/or
  persistent failure of RMC reception (based on detection of RS codewords); and/or
  the first two combined
Other criteria detecting failure of RMC reception may be used in other embodiments. In case the applied criterion detects a dysfunctional (failed) RMC, the RMCR may allow asynchronous application of new RMC settings at both sides of the line, which reduces the size of the command since no time marker needs to be sent.

In one embodiment the RMCR command indicates that new RMCR settings can be applied asynchronously in transmitter and receiver, i.e., these parameters may not necessarily be applied at the same time at the transmitter and receiver, but for example at a next possible point in time in transmitter and receiver independently from each other. In another embodiment, the RMCR command indicates the index of the transmission frame or superframe from which new RMC parameter settings shall take place (e.g., in case when the RMCR triggering criteria can't decisively identify whether RMC is failed or not). In both cases, no response from the transmitter on the reception of RMCR command is needed. Therefore, both asynchronous and synchronous approaches are possible, and the kind of approach in some embodiments may be indicated in the RMCR command. This selection may be made e.g. based on SMR measurements or other criteria.

In other embodiments, the instant of setting new RMC parameters can be indicated in the RMCR command by transmission of special signals towards the RMC receiver, which robustness is even higher than RMC, such as one or more of:
(1) By sending a sync symbol instead of a damaged RMC symbol
(2) By sending two sync symbols back-to-back or another sync symbol pattern at dedicated time.
(3) By sending one or a consecutive number of sync symbols replace non-sync symbols (RMC or data symbols) for indicating transmitter's time of change;
(4) By sending one or a consecutive number of modified sync symbols (e.g. sync symbols with all or part of tones inverted) are used for indicating transmitter's time of change.

In the mentioned cases (1)-(4) the sync symbol is a special symbol with pre-defined structure used for superframe synchronization in G.fast or VDSL2.

In some embodiments, RMCR may be combined with FRA. The FRA procedure is defined in G.fast to restore data connectivity while the RMC operates properly. A combination of FRA with RMCR allows recover simultaneously both RMC and data connectivity in the opposite direction in case both RMC and data are not functional in this direction. In one embodiment the following way of combining RMCR and FRA can be used:
  The corresponding command includes both RMCR and FRA fields in it;
  After receiving the command, the transmitter first looks into the RMCR part of it and modifies the RMC parameters accordingly (asynchronously or synchronously, at the indicated in RMCR time instant);
  After RMC parameters are modified, the transmitter monitors the ACK on the transmitted RMC commands;
  After ACKs are detected (i.e., RMC connectivity is restored), the transmitter sends FRA-R command with corresponding down-count to finalize the FRA part of the command.

In another embodiment, RMCR and FRA are executed simultaneously. The combined RMCR and FRA operation may as follows (in the following example, concepts and techniques disclosed herein are applied to G.fast (G.9701)):
  RMCR trigger. The number of degraded RMC tones exceeds the error correction capability of the applied Reed-Solomon coding
  RMCR request command: The existing Receiver initiated FRA request command for the NOI with Command ID=$03_{16}$ is modified as follows
    The command header and configuration data remains as per G.9701
    The FRA adjustment data field is still 5 bytes long as of today but can be followed by an additional field; this will be indicated by the first byte of this field, BLT status
    The BLT status=[aabb cccc]
      aa meaning as in G.9701:
        aa=00—no bit-loading adjustment for data tones of NOI symbols
        aa=01—decrease the bit-loading per sub-band by the specified parameter value for data tones of NOI symbols
        aa=10—limit the maximum bit loading by the specified parameter value for data tones of NOI symbols
        aa=11—reserved by ITU-T
      bb for type of RMC change:

bb=00—no bit-loading adjustment for RMC tones of NOT RMC symbols and no change in RTS bb=01—RMC tones bit-loading shall be identical to data tones bit-loading which would result from the measure as described for aa=01; the new RTS shall contain all tones of the specified RMC sub-band(s) except those tones which would have a bit-loading smaller than 2 bits or greater than MAXBL-RMC bb=10—RMC tones bit-loading shall be identical to data tones bit-loading which would result from the measure as described for aa=10; the new RTS shall contain all tones of the specified RMC sub-band(s) except those tones which would have a bit-loading smaller than 2 bits or greater than MAXBL-RMC bb=11—reserved by ITU-T cccc=0000 for the FRA as per G.9701; a value greater than 1 describes the time when new RMC parameters shall apply as an execution delay expressed in logical frames after the last sent RMC symbol of the direction associated with this OLR; valid range is from 2 to 15 logical frames; the selected value has to be equal or greater than transmitter's communicated minimal supported value and equal or greater than receiver's minimal supported value The field RMC sub-bands: contains the start and stop frequencies of the RMC sub-band(s) which shall be used as specified by BLT status. It shall be formatted as a band descriptor according to Table 12-21/G.9701. This field is present only if bb of BLT status is unequal 00. Default should be to use one RMC sub-band resulting to 4 additional bytes as compared with the original FRA request command.

RMCR Time of Change Execution: as described above; the transmitter's minimal supported value for the execution delay could be derived by dividing the original 2-byte field Number of RMC DS/US sub-carriers of R-PMD/O-PMD into two parts: the 4 most significant bits of the 16-bit field could be used to represent transmitter's minimal supported value for the execution delay and a value greater than 0 would indicate implicitly to the far-end that the modification of the original FRA is supported.

RMCR Response: No ACK/response may be defined. The receiver shall not wait on a Reply to FRA request command for the NOI from the transmitter and shall execute the change at the time as communicated in the associated request; the transmitter can or can't send FRA-R commands but shall execute the change at the time as communicated in the associated request.

Some of the described embodiments may have one or more of the following advantages, although this need not be the case.

Fast, i.e. from noise impact until executed OLR in a few TDD frames

Re-use of fast SNR measurement engine for FRA possible (noise impact detection in less than one TDD frame)

Re-use of FRA bit-loading for change of RMC

Modified FRA command supports
 old defined FRA mechanism
 robust & fast change of RMC—
 or the combination of both Addition of RMC change information doable by just 4 additional bytes.

Figure 2:
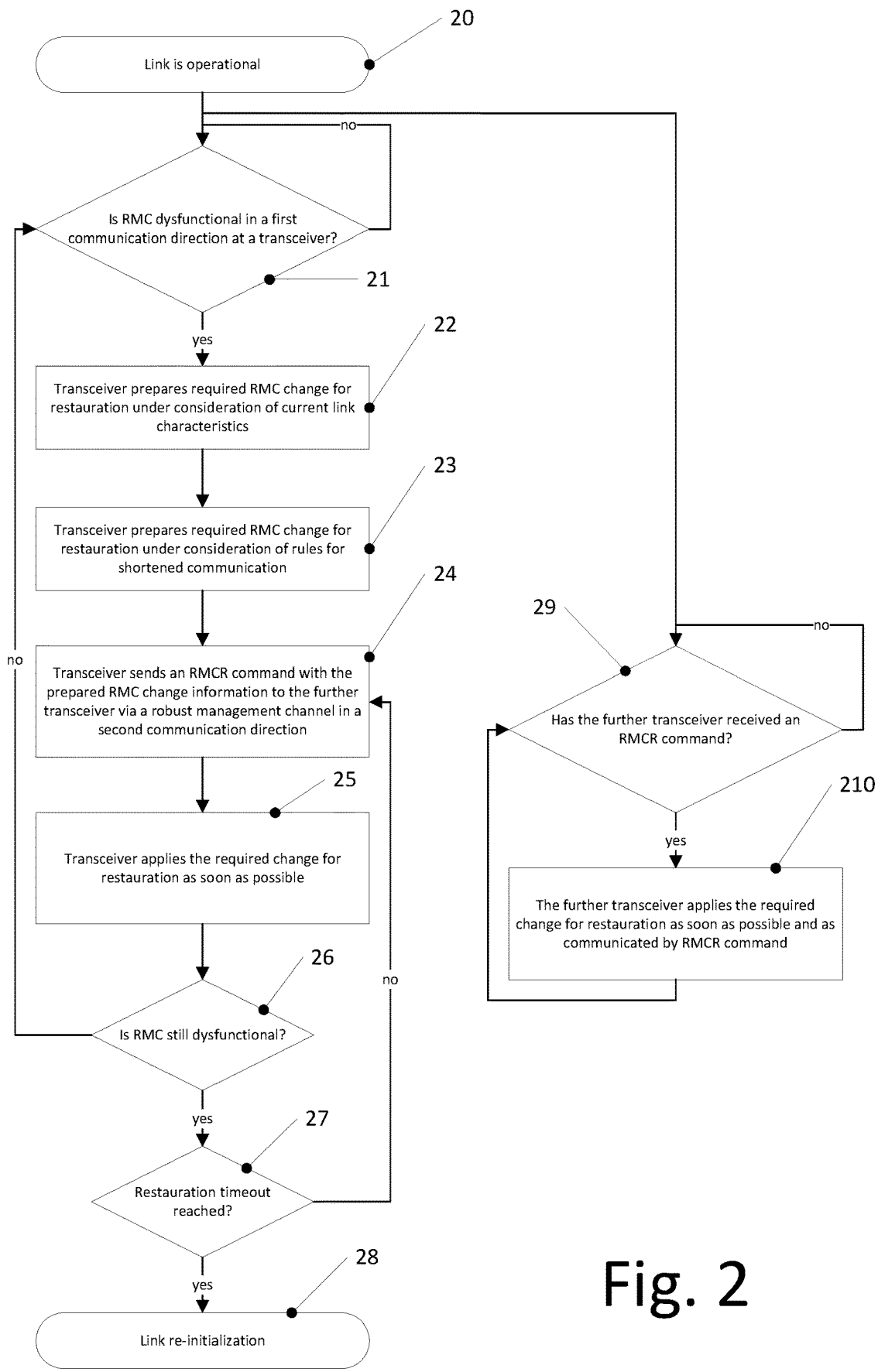
FIG. 2 is a flowchart illustrating a method according to an embodiment.

FIG. 2 is a flowchart illustrating a method according to an embodiment. Other methods may comprise less acts or events. FIG. 2 summarizes some techniques disclosed above for RMC recovery.

At 20 in FIG. 2, a link, e.g. G.fast link, is operational. At 21, the method comprises checking if the RMC is dysfunctional in a first communication direction (from a further transceiver to the transceiver) at a transceiver. The method remains at 21 as long as this is not the case. If this is the case (yes at 21), the RMCR procedure of FIG. 2 starts.

At 22, the transceiver that detected the failure at 22 prepares required RMC changes for restauration of the RMC in the first communication direction, considering current link characteristics. At 23, the transceiver prepares the RMC change taking rules for shortened or condensed communication as explained above into account.

At 24, the transceiver sends an RMCR command with the prepared change information via the RMC in a second communication direction (from the transceiver to the further transceiver).

At 25, the transceiver applies the changes. At 26, the method comprises checking if the RMC is still dysfunctional. If no, the method jumps back to 21. If yes, at 27 the method comprises checking if a timeout is reached for restauration. If no, the method jumps back to 24 for re-sending the RMCR command, and if yes at 28 a complete link initialization is performed.

At the further transceiver, at 29 the method comprises checking if a RMCR command (e.g. sent at 24) is received. If this is the case, the further transceiver applies the corresponding changes for RMCR at 210. Then and otherwise, the method at the further transceiver remains at 29.

As mentioned above, in other embodiments some of the acts or events may be omitted.

Some embodiments introduce special procedures based on signals, transmission formats, and protocols associated with transmission and reception of these signals. The proposed techniques may be implemented as an addition to the current G.fast (G.9701 standard as of December 2014). Every product claiming to be standard-compliant may use techniques discussed above.

Figure 3:
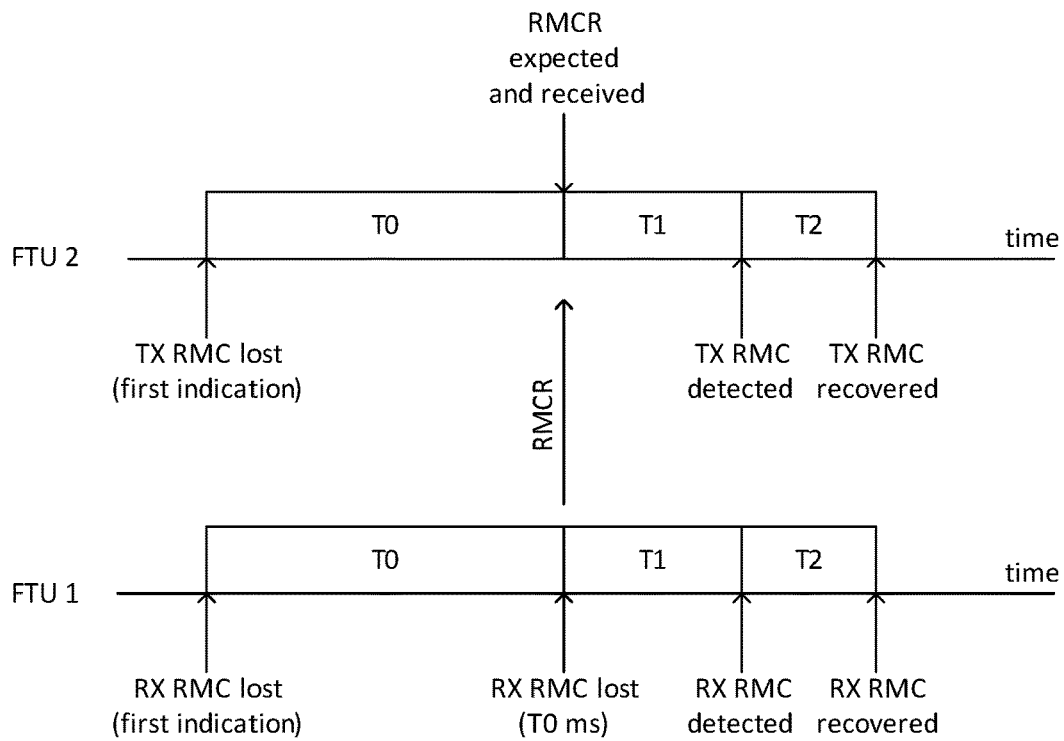
FIG. 3 is a timing diagram of a method according to an embodiment.

FIG. 3 illustrates a timing diagram of a method according to an embodiments, using techniques as discussed above. The example of FIG. 3 may be used in a G.fast communication system, where some transceivers are referred to as FTU (Fast transceiver unit). In the scenario, a RMC from a first transceiver FTU1 to a second transceiver FTU2 is still operable (referred to as transmit RMC in the following), while the RMC from the second transceiver to the first transceiver (receive RMC) is disrupted.

When FTU1 detects loss of the receive RMC, it sends to FTU2 an RMCR command. The detection may be done within T0 ms. The RMCR proposes a new RTS and bit loading, which is either one determined by FTU1 or a backup RTS and bit loading determined in advance, e.g. established at initialization.

After sending RMCR command, FTU1 switches its receiver to the proposed RTS (requested by the FTU1 or the backup set) and waits for the receive RMC to be recovered within (T1+T2) ms (the RMC e.g. should be detected within T1 ms following T2 ms with not more than 1 error). The procedure so far uses techniques as explained above for recovery.

If FTU1 does not detect the receive RMC being recovered within T1 ms, FTU1 according to an embodiment switches to the backup RTS set in both transmit and receive directions and waits for RMC recovery in both directions during T3 ms (no more than 1 error during T2 ms).

If FTU1 does not detect RMC recovery in both directions after T3 ms, it moves to re-initialization.

From the perspective of FTU2, the method may be as follows:

When FTU2 detects loss of transmit RMC (no ACK bit), it expects an RMCR command. The detection shall be done within T0 ms.

Upon reception of RMCR command FTU2 changes the transmit RTS to one defined in the RMCR command (requested by the receiver or the backup set established at initialization) and waits for recovery of RMC in the transmit direction.

If FTU2 does not detect transmit RMC recovery after (T1+T2) ms, it switches to the backup RTS set in both transmit and receive directions and waits for RMC recovery in both directions during T3 ms (no more than 1 error during T2 ms).

If FTU2 does not detect RMC recovery in both directions after T3 ms, it moves to re-initialization.

Figure 4:
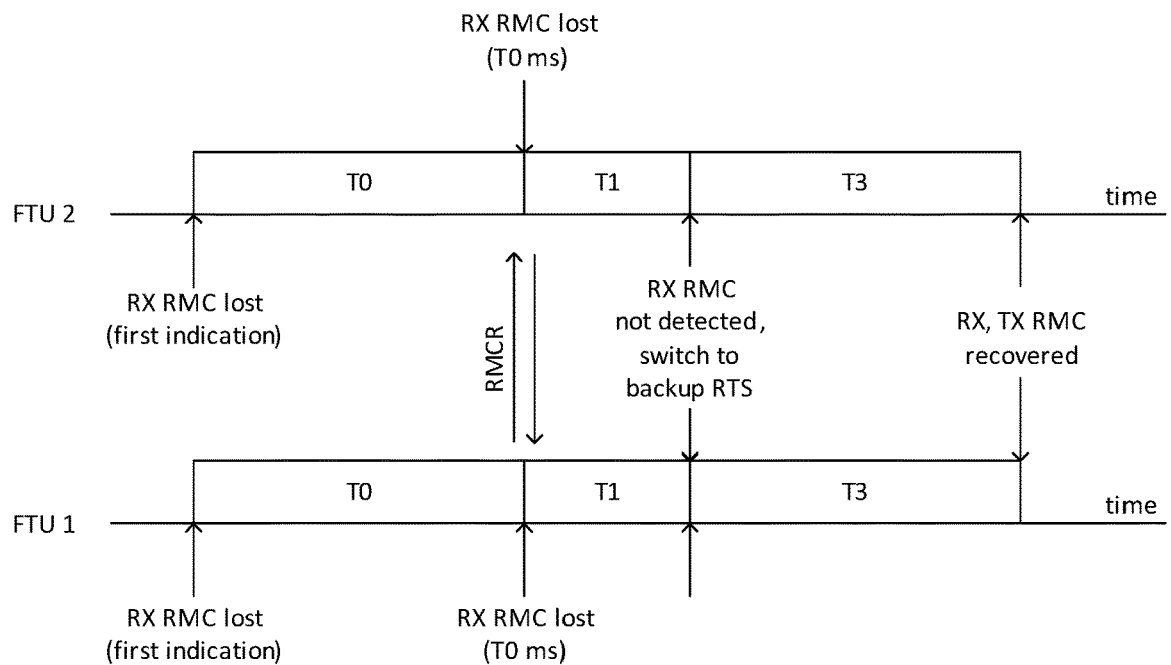
FIG. 4 is a timing diagram of a method according to a further embodiment.

FIG. 4 illustrates a method according to a further embodiment. While some of the embodiments discussed above assume that the RMC remains operable in one direction, FIG. 4 covers a case where the RMC is disrupted in both direction. Similar to FIG. 3, FIG. 2 uses an example scenario with transceivers FTU1, FTU2.

Here, both FTU1 and FTU2 detect a loss of RMC (e.g. no ACK received, no messages received) and send a RMCR command. When no RMCR commands are received, both FTU1 and FTU2 switch to the backup RTS set after (T1+T2) ms, as mentioned above, and wait for RMC recovery during T3 ms.

Example values for the times may be:

T0: 25 ms (the intention is to make is smaller than 1 or defect detection time)

T1: 6 ms (few TDD frames is sufficient time for RMC to recover if it can recover with new RTS)

T2: 12 ms (two superframes with not more than one error in RMC)

T3: T3≥T1+T2 (few TDD frames is a sufficient time for RMC to recover if it can recover with backup RTS, but if not, it seems to be more consistent to wait until re-start due to 1 or persistence timeout).

However, these values are only non-limiting examples.

Some embodiments are implemented according to the following examples:

Example 1

A method, comprising:

at a transceiver, detecting a failure of at least a robust management channel (RMC) in a first communication direction from a further transceiver to the transceiver, and transmitting, by the transceiver, a robust management channel restoration (RMCR) command via a robust management channel in a second communication direction from the transceiver to the further transceiver in response to detecting the failure.

Example 2

The method of example 1, wherein the RMCR command comprises at least one parameter for restoring the RMC in the first communication direction.

Example 3

The method of example 2, wherein the at least one parameter comprises a robust management channel tone set.

Example 4

The method of example 2 or 3, wherein at least one parameter comprises a bit loading for the robust management channel.

Example 5

The method of any one of examples 2 to 4, wherein one or more parameters of the at least one parameter are comprised in the RMCR command in condensed or shortened form.

Example 6

The method of any one of examples 2-5, wherein the at least one parameter is determined based on an actual signal-to-noise ratio in the first communication direction.

Example 7

The method of any one of examples 1-6, wherein the robust management channel is a robust management channel as defined in G.9701 12/14.

Example 8

The method of any one of examples 1-7, further comprising restoring the robust management channel in the first communication direction based on the RMCR command.

Example 9

The method of any one of examples 2-6 and according to example 8, wherein the restoring comprises restoring the robust management channel in the first communication direction based on the at least one parameter.

Example 10

The method of example 8 or 9, wherein said restoring comprises restarting the robust management channel in the first communication direction from the further transceiver to the transceiver asynchronously in the transceiver and the further transceiver.

Example 11

The method of example 8 or 9, wherein said restoring comprises restarting the robust management channel in the first communication direction from the further transceiver to the transceiver in the transceiver and the further transceiver at a same time Example 12. The method of any one of examples 8-11, further comprising restoring at least one further channel using at least one of the RMC in the second communication direction or the restored RMC in the first communication direction.

Example 13

The method of example 12, wherein the at least one further channel comprises one or more of a data channel in the first communication direction, an embedded operation channel (eoc) in the first communication direction, a data channel in the second communication direction, or an embedded operation channel (eoc) in the second communication direction.

Example 14

The method of example 12 or 13, wherein the restoring at least one further channel is performed after restoration of the RMC in the first communication direction.

Example 15

The method of example 12 or 13, wherein the restoring at least one further channel is performed parallel to restoring of the RMC in the first communication direction.

Example 16

The method of any one of examples 8-15, wherein for said restoring the transceiver and/or the further transceiver uses a shortest available robust management channel codeword size.

Example 17

The method of any one of examples 8-16, wherein for said restoring robust management channel tones use a same minimum bit loading.

Example 18

The method of any one of examples 8-17, wherein said restoring comprises using a robust management channel tone set based on predefined rules.

Example 19

The method of example 18, wherein the rules comprise a rule according to which a fixed number NRTS of new robust management channel tones are selected based on a current bit loading on data symbols, wherein the first NRTS tones with a highest bit loading starting from one of a lowest tone index or an indicated tone index are selected.

Example 20

The method of example 18 or 19, wherein the rules comprise a rule according to which the fixed number NRTS of new robust management channel tones are selected based on the current bit loading on data symbols, wherein the first NRTS tones with a highest bit loading starting from one of a lowest tone index or an indicated tone index but not used in a current robust management channel tone set are selected.

Example 21

The method of any one of examples 18-20, wherein the rules comprise selecting one or more groups of tones.

Example 22

The method of any one of examples 8-21, wherein said restoring comprises determining a number of tones for the robust management channel based on a measured signal to noise ratio in the first communication direction.

Example 23

The method of any one of examples 1-22, further comprising repeatedly transmitting the RMCR command until restoration of the robust management channel in the first communication direction.

Example 24

The method of example 23, further comprising detecting restoration of the robust management channel based on correctly received robust management channel codewords.

Example 25

The method of any one of examples 1-24, wherein the RMCR command comprises an identifier.

Example 26

The method of any one of examples 1-25, wherein the RMCR command comprises a time marker.

Example 27

The method of any one of examples 1-26, further comprising performing a fast rate adaptation (FRA).

Example 28

The method of any one of examples 1-27, wherein the RMCR command comprises one or more codewords having a bit length equal to or less than 32 to 64 Bytes.

Example 29

The method of any one of examples 1-28, further comprising communicating selected robust management channel tones.

Example 30

The method of any one of examples 1-29, wherein said detecting a failure comprises detecting a critical reduction of a signal to noise ratio in the first communication direction.

Example 31

The method of any one of examples 1-30, wherein said detecting a failure comprises detecting a persistent failure of robust management channel reception, which may be based on a detection of Reed Solomon code words.

Example 32

The method of any one of examples 1-31, wherein said detecting a failure comprises detecting a failure in an embedded operation channel in the second communication direction.

Example 33

The method of any one of examples 1-32, further comprising performing a fast rate adaptation simultaneously to a robust management channel restoration.

Example 34

A method, comprising:
at a further transceiver, receiving an RMCR command via a RMC from a transceiver, and
restoring an RMC in a first communication direction from the further transceiver to the transceiver based on the RMCR command.

Example 35

The method of example 34, wherein the RMCR command comprises at least one parameter for restoring the RMC in the first communication direction.

Example 36

The method of example 35, wherein the at least one parameter comprises a robust management channel tone set.

Example 37

The method of example 35 or 36, wherein at least one parameter comprises a bit loading for the robust management channel.

Example 38

The method of any one of examples 35 to 37, wherein one or more parameters of the at least one parameter are comprised in the RMCR command in condensed or shortened form.

Example 39

The method of any one of examples 35-38, wherein the restoring comprises restoring the robust management channel in the first communication direction based on the at least one parameter.

Example 40

The method of any one of examples 34-39, wherein the robust management channel is a robust management channel as defined in G.9701 12/14.

Example 41

The method of any one of examples 34-40, wherein said restoring comprises restarting the robust management channel in the first communication direction from the further transceiver to the transceiver asynchronously in the transceiver and the further transceiver.

Example 42

The method of any one of examples 34-40, wherein said restoring comprises restarting the robust management channel in the first communication direction from the further transceiver to the transceiver in the transceiver and the further transceiver at a same time

Example 43

The method of any one of examples 34-42, further comprising restoring at least one further channel using at least one of the RMC in the second communication direction or the restored RMC in the first communication direction.

Example 44

The method of example 43, wherein the at least one further channel comprises one or more of a data channel in the first communication direction, an embedded operation channel (eoc) in the first communication direction, a data channel in the second communication direction, or an embedded operation channel (eoc) in the second communication direction.

Example 45

The method of example 43 or 44, wherein the restoring at least one further channel is performed after restoration of the RMC in the first communication direction.

Example 46

The method of example 43 or 44, wherein the restoring at least one further channel is performed parallel to restoring of the RMC in the first communication direction.

Example 47

The method of any one of examples 34-46, wherein for said restoring the transceiver and/or the further transceiver uses a shortest available robust management channel codeword size.

Example 48

The method of any one of examples 34-47, wherein for said restoring robust management channel tones use a same minimum bit loading.

Example 49

The method of any one of examples 34-48, wherein said restoring comprises using a robust management channel tone set based on predefined rules.

Example 50

The method of example 49, wherein the rules comprise a rule according to which a fixed number NRTS of new robust management channel tones are selected based on a current bit loading on data symbols, wherein the first NRTS tones with a highest bit loading starting from one of a lowest tone index or an indicated tone index are selected.

Example 51

The method of example 49 or 50, wherein the rules comprise a rule according to which the fixed number NRTS of new robust management channel tones are selected based on the current bit loading on data symbols, wherein the first NRTS tones with a highest bit loading starting from one of a lowest tone index or an indicated tone index but not used in a current robust management channel tone set are selected.

Example 52

The method of any one of examples 49-51, wherein the rules comprise selecting one or more groups of tones.

Example 53

The method of any one of examples 34-52, wherein said restoring comprises determining a number of tones for the robust management channel based on a measured signal to noise ratio in the first communication direction.

Example 54

The method of any one of examples 34-53, further comprising repeatedly receiving the RMCR command until restoration of the robust management channel in the first communication direction.

Example 55

The method of any one of examples 34-54, wherein the RMCR command comprises an identifier.

Example 56

The method of any one of examples 34-55, wherein the RMCR command comprises a time marker.

Example 57

The method of any one of examples 34-56, further comprising performing a fast rate adaptation (FRA).

Example 58

The method of any one of examples 34-57, wherein the RMCR command comprises one or more codewords having a bit length equal to or less than 32 to 64 Bytes.

Example 59

The method of any one of examples 34-58, further comprising performing a fast rate adaptation simultaneously to a robust management channel restoration.

Example 60

A transceiver and/or further transceiver and/or system comprising a transceiver and further transceiver, configured to implement the method of any one of the preceding examples.

Example 61

The transceiver, further transceiver and/or system of example 60, being implemented according to 0.9701 12/14

The above examples show only some implementation possibilities and are not to be construed as limiting.

The invention claimed is:

1. A transceiver, comprising:
a receiver circuit configured to receive a robust management channel restoration (RMCR) command via a robust management channel (RMC) in a second communication direction from another transceiver to the transceiver; and
a transmitter circuit configured to restore a failed RMC in a first communication direction from the transceiver to the another transceiver based on the RMCR command.

2. The transceiver of claim 1, further comprising circuitry associated with the transmitter circuit configured to restore the failed RMC in the first communication direction based on the received RMCR command in the second communication direction.

3. The transceiver of claim 2, wherein the circuitry is configured to restore the failed RMC using a robust management channel tone set based on predefined rules.

4. The transceiver of claim 3, wherein the predefined rules comprise selecting one or more groups of tones.

5. The method of claim 3, wherein the predefined rules comprise a rule according to which a fixed number NRTS of new robust management channel tones are selected based on a current bit loading on data symbols, wherein the first NRTS tones with a highest bit loading starting from one of a lowest tone index or an indicated tone index are selected.

6. The method of claim 3, wherein the predefined rules comprise a rule according to which the fixed number NRTS of new robust management channel tones are selected based on the current bit loading on data symbols, wherein the first NRTS tones with a highest bit loading starting from one of a lowest tone index or an indicated tone index but not used in a current robust management channel tone set are selected.

7. The transceiver of claim 2, wherein the circuitry is configured to restore the failed RMC by restarting the RMC in the first communication direction from the transceiver to the another transceiver asynchronously in the transceiver and the another transceiver.

8. The transceiver of claim 2, wherein the circuitry is configured to restart the robust management channel in the first communication direction from the further transceiver to the transceiver in the transceiver and the further transceiver at a same time.

9. The transceiver of claim 2, wherein the circuitry is configured to restore at least one further channel using at least one of the RMC in the second communication direction or the restored RMC in the first communication direction.

10. The transceiver of claim 9, wherein the restoring at least one further channel is performed parallel to restoring of the RMC in the first communication direction.

11. The transceiver of claim 9, wherein the at least one further channel comprises one or more of a data channel in the first communication direction, an embedded operation channel (eoc) in the first communication direction, a data channel in the second communication direction, or an embedded operation channel (eoc) in the second communication direction.

12. The transceiver of claim 9, wherein the circuitry is configured to restore the at least one further channel after restoration of the RMC in the first communication direction.

13. The transceiver of claim 2, wherein the circuitry is configured to restore the failed RMC by determining a number of tones for the RMC based on a measured signal to noise ratio in the second communication direction.

14. The transceiver of claim 2, wherein, for restoring the RMC in the first communication direction, the circuitry employs tones having a same minimum bit loading.

15. The transceiver of claim 2, wherein the restoring comprises restoring the robust management channel in the first communication direction based on the at least one parameter.

16. The transceiver of claim 2, wherein the circuitry is further configured to perform a fast rate adaptation (FRA).

17. The transceiver of claim 1, wherein the RMCR command comprises at least one parameter for restoring the RMC in the first communication direction.

18. The transceiver of claim 1, wherein the robust management channel is a robust management channel as defined in G.9701 12/14.

19. The transceiver of claim 1, wherein the transmitter circuit is configured to repeatedly transmit the RMCR command until restoration of the RMC in the first communication direction.

20. The transceiver of claim 1, wherein the RMCR command comprises one or more codewords having a bit length equal to or less than 32 to 64 Bytes.

21. The transceiver of claim 1, wherein the RMCR command comprises an identifier.

22. The transceiver of claim 1, wherein the RMCR command comprises a time marker.

23. The transceiver of claim 1, wherein the RMCR command comprises at least one parameter for restoring the RMC in the first communication direction.

24. The transceiver of claim 23, wherein the at least one parameter comprises a robust management channel tone set.

25. The transceiver of claim 23, wherein at least one parameter comprises a bit loading for the robust management channel.

26. A transceiver, comprising:
a receiver circuit configured to detect a failure of at least a robust management channel (RMC) in a first communication direction from a further transceiver to the transceiver, and
a transmitter circuit configured to transmit a robust management channel restoration (RMCR) command via a robust management channel in a second communication direction from the transceiver to the further transceiver in response to detecting the failure and enable the further transceiver to restore the RMC in the first communication direction based on the RMCR command.

27. The transceiver of claim 26, wherein the receiver circuit is configured to detect the failure of the RMC by detecting a persistent failure of RMC reception.

28. The transceiver of claim 27, wherein the receiver circuit is configured to detect a persistent failure of RMC reception based on a detection of Reed Solomon code words.

* * * * *